United States Patent [19]

Merritt et al.

[11] Patent Number: 4,767,635
[45] Date of Patent: Aug. 30, 1988

[54] METHOD FOR THE PREPARATION OF FLAVORED POPPING CORN

[75] Inventors: Carleton G. Merritt, Phoenix; Stephen R. Gillmore, Cato, both of N.Y.

[73] Assignee: Borden, Inc., Columbus, Ohio

[21] Appl. No.: 831,075

[22] Filed: Feb. 18, 1986

Related U.S. Application Data

[63] Continuation of Ser. No. 691,831, Jan. 16, 1985, abandoned.

[51] Int. Cl.⁴ ............................................... A23L 1/36
[52] U.S. Cl. .................................. 426/272; 426/309; 426/460; 426/507
[58] Field of Search ................. 426/93, 446, 445, 447, 426/450, 460, 272, 302, 304, 507, 573, 575, 577, 578, 629, 448, 288, 442, 808

[56] References Cited

U.S. PATENT DOCUMENTS

| | | |
|---|---|---|
| 1,658,486 | 2/1928 | Howe .................................. 99/323.8 |
| 1,969,730 | 8/1934 | Daughters ........................... 426/442 |
| 2,222,560 | 11/1940 | Clickner . |
| 2,240,759 | 5/1941 | Chandler . |
| 2,475,133 | 9/1947 | Furter et al. ........................... 426/72 |
| 2,518,247 | 8/1950 | Nairn . |
| 2,604,407 | 7/1952 | Martin . |
| 2,648,610 | 8/1953 | Martin ................................. 426/618 |
| 2,673,806 | 3/1954 | Colman . |
| 2,702,246 | 2/1955 | Kinsella . |
| 2,843,080 | 7/1958 | Woodruff ........................... 99/323.8 |
| 3,102,032 | 8/1963 | Lippert . |
| 3,140,952 | 7/1964 | Cretors ............................... 99/323.8 |
| 3,341,336 | 9/1967 | Jokay .................................. 426/302 |
| 3,537,861 | 11/1970 | Schwarzkopf ....................... 426/250 |
| 3,556,815 | 1/1971 | Fujiwara .............................. 426/120 |
| 3,580,727 | 5/1971 | Gulstad ............................... 426/440 |
| 3,617,309 | 11/1971 | Rebane . |
| 3,689,291 | 9/1972 | Draper . |
| 3,704,133 | 11/1972 | Kracauer . |
| 3,783,820 | 1/1974 | Hautly et al. ....................... 99/323.5 |
| 3,843,814 | 10/1974 | Grunewald-Kirstein ........... 426/307 |
| 3,851,081 | 11/1974 | Epstein . |
| 3,851,574 | 12/1974 | Katz et al. ........................... 426/107 |
| 3,882,255 | 5/1975 | Gorham, Jr. et al. . |
| 3,961,091 | 6/1976 | Caccavale et al. ................... 426/307 |
| 4,053,650 | 10/1977 | Chino et al. ......................... 426/304 |
| 4,096,281 | 6/1978 | Young et al. ......................... 426/89 |
| 4,156,742 | 5/1979 | Babcock et al. . |
| 4,163,066 | 7/1979 | Mason et al. ........................ 426/99 |
| 4,409,250 | 10/1983 | Van Hulle et al. .................. 426/621 |
| 4,640,842 | 2/1987 | May ..................................... 426/625 |

OTHER PUBLICATIONS

Minifie 1982, Chocolate, Cocoa and Confectionery: Science and Technology, second edition, AVI Publishing Co., Westport, Conn. p. 464.

Iglesias et al. 1982, Handbook of Food Isotherms: Water Sorption Parameters for Food and Food Components, AVI Publishing Co., Westport, Conn. pp. 85, 224 and 225.

*Primary Examiner*—Donald E. Czaja
*Assistant Examiner*—Carolyn Paden
*Attorney, Agent, or Firm*—Robbins & Laramie

[57] ABSTRACT

A free-flowing uniformly flavorant coated unpopped corn and method of preparation thereof wherein the unpopped corn is essentially oil and fat-free and retains a substantial amount of added salt and flavorant upon popping in a hot air popper comprising unpopped corn coated with an adherent flavoring consisting essentially of an edible adhesive, e.g. gelatin, an edible salt and optional colorants and flavors.

17 Claims, No Drawings

METHOD FOR THE PREPARATION OF FLAVORED POPPING CORN

This application is a continuation of application Ser. No. 691,831, filed Jan. 16, 1985 now abandoned.

This invention relates to ready-to-pop, flavored popcorn especially suited for popping in an oil-and-fat-free hot air popper.

BACKGROUND OF THE INVENTION

Freshly popped popcorn, with its characteristic aroma and taste, has long been popular, especially when flavored, e.g. salted and flavored.

The availability of freshly popped and flavored popcorn, however, has been limited to popcorn stands, or home preparation by a laborious procedure which has required the use of various oils and/or a fat fryer. Thus, for example, ready-to-pop popcorn has long been available in ready-to-heat, expandable packages wherein the unpopped popcorn is coated or packaged in a vegetable fat, oil or shortening which serves to both fry the popcorn during heating over gas stoves or, more recently, in microwave ovens, and which serves as a coating or carrier for added salt, sugar or various other flavorings and/or coloring, to give a popped corn having salt and flavoring adhering, to the surface of the popped kernels.

These prior art procedures have all required oil or fat to adhere the flavor to the product, which results in an oily and greasy texture and feel as well as high calorie content. Oil popped popcorn has become less acceptable to consumers in recent years with the availability of dryer, greaseless hot air popped popcorn.

Hot air corn poppers have the obvious advantage of producing popcorn which is neither greasy nor oily in taste and which is lower in calories. It has been found, however, that freshly popped popcorn from hot air poppers does not retain significant levels of added salt or flavoring to give a product acceptable to flavored popcorn consumers. The use of prior art oil based carriers for salt and flavorant to give a flavored popcorn upon heating in conventional hot oil poppers or microwave ovens does not give acceptable popped corn when used in hot air popcorn poppers in view of the high level of burning or smoking produced by heating of oil in these hot air poppers.

Aoplicants have unexpectedly found that a ready-to-eat, freshly popped salted and flavored popcorn can be obtained in hot air poppers through use of a novel, lipid-free coating, containing an edible adhesive, flavorings such as salt and various other optional flavorings and colorings, which is uniformly coated over the hull of the unpopped popcorn. The resulting product is a free-flowing product which can be conveniently packaged in jars and can be easily poured, as needed, into a hot air popper without any mess, burning or smoke. The resulting product will produce a freshly popped, low oil popcorn which retains virtually all of the added salt and flavor on the popped kernel without burning or smoking.

It is the principal object of this invention to provide an unpopped popcorn and method of preparation thereof which is specifically adapted to use in hot air poppers for preparing an already salted and flavored popcorn without need for the use of oil, fat or shortening.

It is a further object of this invention to provide an already salted and flavored low oil popcorn for popping in hot air poppers.

It is a still further object of this invention to provide an already flavored popcorn which is uniformly coated in a freeflowing, unpopped form and which, when popped in a hot air popper, will retain substantially all of its flavorant on the hull portion of the popped corn.

These and other objects of this invention will become apparent from the following detailed description and preferred embodiment of Applicants' invention.

SUMMARY OF THE INVENTION:

The invention involves the preparation of a freeflowing, uniformly oil-and-fat-free flavorant coated unpopped popcorn which retains its flavor upon being popped in a hot air popper, comprising the steps of:

(a) Mixing unpopped popcorn with an oil-and-fat-free aqueous coating mixture consisting essentially of an edible adhesive, and a flavoring such as an edible salt and other optional flavorant(s); and then (b) drying the resulting popcorn and coating mixture to remove moisture in excess of about 11–14% by weight typical for untreated popcorn, to thereby produce a free-flowing, uniformly coated unpopped popcorn product which will retain substantially all of its added flavorant salt and other flavor upon being popped in a hot air popper.

The edible adhesive for the flavorant coating may include proteinaceous adhesives such as gelatin, alginates, e.g. propylene glycol alginate, pectin, gums such as Xanthan gum and gum arabic, and other edible adhesives such as gelatinized starch, malto-dextrin, mannitol, polyvinyl acetate in ethanol and zein and mixtures of these adhesives.

DETAILED DESCRIPTION

Popping corn, as used in the practice of this invention, can be any variety of conventional unpopped popcorn including so-called special hybrid corn or tougher varieties of corn which resist breakage upon mixing in the coating method of this invention.

It is recognized in the art that popping corn should ideally have a moisture content in the range of about 13% to 14% by weight for optimum expansion of the corn during popping.

In the practice of Applicants' invention, wherein the raw unpopped popcorn is coated with an edible adhesive and flavorants, typically in an aqueous solution, it has been found that the degree of retained "pop-ability" of the coated corn, i.e. the popped volume of the popped corn, appears to be proportionately related to the amount of water added to the corn during the mixing/coating step, and which should be removed by subsequent drying. This apparent decrease in popcorn expansion with increasing amounts of water in the coating solution is probably due to the longer drying times which are required to remove the increased amounts of water in the coating solution. Thus it has been found that it is critical to the process of this invention to minimize, to the extent possible, the amount of water used with the adhesive and flavorant solution. Obviously, ethanol or other low boiling point solvents could also be used to adhere the coating while reducing drying times, but these solvents would add to manufacturing costs and are therefore less preferred in the practice of this invention.

The amount of water used in the solution of the edible adhesive and flavorants is, of course, dependent upon the degree of solubility of the adhesive, salt and other flavorants used, but has been found to be generally in the range of about 0.28% to 12.15% by weight of the untreated popcorn, with about 1.0% to 3.0% by weight being preferred.

The edible adhesive used in the coated popcorn product of this invention can be any edible gum; edible proteinaceous adhesive such as gelatin, pectin and alginates; carbohydrates such as pregelatinized starch and malto-dextrin or other edible adhesives such as polyvinyl acetate, mannitol, and zein and mixtures of these edible adhesives.

The amount of the adhesive used in the flavorant coating of this invention is determined by the amount required to adfix the edible salt and other optional flavors to the hull of the unpopped popcorn, with the upper limits being obviously a matter of optimization for economic purposes. It has been generally determined that when the preferred adhesive, gelatin, is used, an amount of from about 0.28% to about 2.10% by weight of the final weight of the coated unpopped popcorn is sufficient to achieve over 85% retention of added salt on the final hot air popped popcorn with amounts of adhesive in the range of about 0.3% to about 1.2% by weight being preferred. Larger amounts of gelatin or other adhesive can, of course, be used, but this would involve not only greater ingredient costs but would involve the use of larger amounts of water or other solvent which would have to be dried and which could reduce the volume of expansion of the final popped corn.

The amount of edible salt used as the preferred flavorant is, of course, determined by the desired organoleptic properties of the final popped corn and is generally used in the range of from as little as about 0.47% by weight of the coated unpopped corn, when used with other added flavors such as artificial butter, cheese, and pizza flavors, etc., colors, caramel, sugar or aspartame, to about 6.5% by weight of the coated unpopped corn product of this invention when used as the only added flavorant. The preferred range of added salt is generally in the range of about 3.5% to about 4.5% by weight of the unpopped corn product.

The preferred adhesive for the flavorant coating of this invention is gelatin, particularly 250 Bloom gelatin, which is typically dissolved in warm water prior to addition of salt and other optional flavors prior to being mixed or spray applied to the unpopped corn hull. Gelatin has been found to provide an excellent adhesive with concentrated solutions, thereby minimizing added water which will have to be dried, and forms a good film on the hull to hold in the required moisture of the unpopped corn and yet produce a nonhygroscopic product. The gelatin is also bland in taste so as not to interfere with the flavor of the flavored popped corn and does not smoke, burn or melt in the hot air of conventional hot air corn poppers.

A critical feature of this invention is that the uniformly applied coating on the unpopped corn of this invention has achieved substantial retention of flavor on the popped corn without the need for the oil, fat, shortening and/or butter additives which have heretofore been deemed essential in achieving a retained flavor coating on popcorn which is subsequently popped, e.g. as in the microwave prepared popcorn disclosed in U.S. Pat. No. 3,851,574 to Katz et. al. A comparison of the prior art product of the Katz et al patent, which requires a fat and/or oil matrix or glaze for microwave popping with a popcorn prepared in the same manner but without oil or fat in example 27 and 28 shows that fat and oil are essential for both obtaining acceptable flavor retention as well as avoiding uneven heating, and consequent burning of the final popped corn. In contrast, it is essential to the practice of the instant invention to use an essentially oil and fat free coating to achieve substantial retention of added salt and other flavor in a popped corn prepared by hot air popping without smoking or burning the resultant popped corn product.

The absence of fat, oil and/or shortening is, in fact, critical to the practice of the instant invention to provide an unpopped corn which can be used in hot air poppers without burning or smoking and which has the benefit of reduced calories and avoidance of oily texture and taste.

Though not part of this invention, Applicants' unpopped corn could, of course, be used by consumers with added oil or fat for conventional oil popcorn poppers, or even in microwave ovens, but this would detract from the novel and unobvious feature of this invention which is its use in hot air poppers for producing essentially oil-free popcorn with excellent added salt and flavor retention properties.

In accordance with the process of this invention for preparing the novel free-flowing, uniformly flavorant coated unpopped corn of this invention, the conventional unpopped corn is coated with a solution of the edible adhesive, e.g. 250 Bloom gelatin, salt and other optional flavor additives which have been dissolved in a solvent, such as water, by mixing in a conventional blender, high speed ribbon type blade mixer or pill coating type revolving pan. After thorough mixing, water or other solvent is removed by heating to a temperature of the order of 100° F. to 200° F., air drying or a combination of these techniques to give a relatively dry, free-flowing popcorn which is uniformly coated by a continuous layer of flavor coating over the exterior surface of the unpopped hull.

Alternatively, the unpopped corn can be coated by spraying with a solution of the edible adhesive, salt and other flavors or by mixing the unpopped corn with the solvent followed by addition of the edible adhesive, salt and flavors, and then dried to the free-flowing end product A still further technique for fixing the preferred salt and other flavors to the hull of the unpopped corn is by first softening or modifying the unpopped corn hull by treatment with alkalis such as sodium hydroxide or acids such as dilute tri-chloro acetic acid to make the hull adhesive to subsequently added salt and other optional flavorants, and then drying. When an alkali such as sodium hydroxide is used to soften the popcorn hull, the pH of the alkali treated corn hull should then be neutralized with an acid, such as dilute hydrochloric acid, prior to addition of salt and other flavorants.

The process of this invention thus provides an oil-free unpopped popcorn upon which salt and optional flavors are fixed for subsequent retention of flavors upon popping in hot air poppers, and additionally provides an added level of protection for the popcorn from drying out during shelf storage and while being heated during popping.

The novel coated popping corn product and process of this invention can be more clearly seen from the following detailed description of the preferred embodiments of this invention.

The following represents Applicants' preferred embodiments for preparing the free-flowing, non-fat salt and flavorant coated unpopped corn product of this invention.

Salt Coated Popping Corn

A gelatin mixture for coating unpopped corn is prepared by slowly adding 4 lbs. 3 oz. of commercially available 250 Bloom gelatin to 20 lbs. 13 oz. of water weighed at a temperature in the range of about 160° F.–180° F. in a kettle equipped with a high speed agitator under conditions of high agitation and continue mixing until uniform, within approximately 15 minutes. Table salt, in an amount of about 2 lbs. 4 oz., is then added under continual mixing and mixing is continued for an additional 5 minutes.

The unpopped popcorn is then coated with the resulting gelatin and salt mixture in the following proportions:

| | |
|---|---|
| Gelatin | 27.25 lbs. |
| Popping Corn | 1000. lbs. |
| Salt | 42. lbs. |
| Total Batch | 1069.25 lbs. |

The gelatin mix is added to the unpopped popcorn in a ribbon or other type mixer with a blade clearance of ¼" to ½" and allowed to mix for about 1-3 minutes. Additional salt is then added and agitation is continued for an additional 2-5 minutes. The water and salt added are adjusted to give a salt content of about 4% by weight of the final coated product.

The resulting gelatin solution coated popcorn is then dried to a free-flowing, coated popcorn product having a moisture content of at least about 11.0% to about 14.0% by weight, with a moisture content of about 13.0% being optimum. Drying can be achieved by spreading the gelatin coated popcorn on a continuous belt, bucket or tray dryer in a bed. Alternatively, the gelatin coated popping corn can be dried in a conventional continuous rotary dryer turning at speeds of about 1 to 40 rpm. Drying times are, of course, dependent upon the surface area to be dried and the dryer temperature, with typical drying conditions ranging from 2 minutes at 200° F. to 160 minutes at temperatures of about 100° F. when using 1,000 caloric feet/minute of dryer width on a continuous dryer.

Following drying, the free-flowing coated popcorn is discharged into an optionally rotary screen to remove fines, and is then bulk packed in polyethylene lined drums at storage temperatures of between about 30° F. to no more than about 100° F., with temperatures of 50° F.–90° F. being preferred.

The final product, which is typically stored no more than 4 months, is then optionally vacuum packed in conventional glass jars, e.g. No. 1 glass jars, for sale.

SALT AND BUTTER FLAVORED POPPING CORN

A salt and butter flavored popping corn was prepared according to the following procedure using a gelatin based flavorant coating solution is prepared from the following:

| Ingredients | Weight |
|---|---|
| Gelatin | 2.5 lbs. |
| Salt | 2.375 lbs. |
| Coloring | |
| (Yellow #5) | .14 lbs. |
| (Yellow #6) | .023 lbs. |
| Water | 20.812 lbs. |
| Total | 25.850 lbs. |

The gelatin and colorings are slowly added to the water, which is being vigorously agitated in a kettle, and are mixed until a uniform solution is obtained, within about 15 minutes. The salt is then added under continual mixing for an additional 5 minutes.

The resulting gelatin solution is then mixed with popping corn, artificial butter flavors and salt in the following proportions:

| | |
|---|---|
| Gelatin Solution | 25.850 lbs. |
| Popping Corn | 1,000.0 lbs. |
| Salt | 43.000 lbs. |
| Artificial Butter Flavor | 10.875 lbs. |
| Total | 1,079.725 lbs. |

The gelatin solution is mixed with the popcorn for about 1-3 minutes in a ribbon or other conventional mixer having a blade clearance of about ¼" to ½". Artificial butter flavors are then added and the mixing is continued for an additional 1 -3 minutes. Salt is then added during continual mixing for another 2 -5 minutes to give a mixture that, when subsequently dried to the coated product, has a final salt content of about 4% by weight.

The resulting gelatin solution, salt and flavorant coated popcorn mixture is then dried, to a residual moisture content of at least 11% and preferably about 13% by weight of the final product. Fines are removed from the dried, uniformly coated popcorn by use of a rotary screen and the coated popcorn is then stored in polyethylene lined drums until vacuum packed in glass bottles.

The following examples are given to further illustrate embodiments of the present invention, but are not meant to be construed as limiting the scope of the invention:

EXAMPLES 1 and 2

Add water to 2 gallon Hobart mixing bowl equipped with a dough hook or normal paddle. Add Kelcoloid S, (propylene glycol alginate supplied by Kelco Co.) and mix at high speed for 15 minutes or until uniform. Add popcorn and mix at low speed for 2 minutes. Add salt, butter and color where applicable and mix an additional 2 minutes. Remove, placing mass on mesh tray about 1 inch deep. Trays are placed in small lab convection oven set at 125° F. for about 1 hour. The product, being slightly stuck together, is broken apart to individual kernels and is then ready for popping.

| | Example 1 | Example 2 |
|---|---|---|
| Popcorn | 3800 grams | 3800 grams |
| Fine Salt | 200 grams | 200 grams |
| Water | 188 grams | 188 grams |
| Artificial Butter Flavor | — | 45 grams |
| Kelcoloid S | 12.5 grams | 12.5 grams |
| Artificial Colors | — | 2.2 grams |

EXAMPLES 3 and 4

Add water to a Hobart vertical cutter mixer or large Waring type blender then add Kelcoloid S and mix at high speed for about 5 minutes or until uniform. Add popcorn to a small 15 gallon ribbon type mixer with blades that clear sides by about ¼ inch. Start mixer running and slowly pour the alginate slurry in the center. Allow to mix 5 minutes then add salt, butter flavors and colors where applicable. Continue to mix an additional 5 minutes. Remove, placing mass on mesh tray about 1 inch deep. Place trays in Proctor & Schwartz dryer set at 120° F. with maximum air flow for about 40 minutes. The product, being slightly stuck together, is broken apart to individual kernels and is then ready for popping.

|  | Example 3 | Example 4 |
|---|---|---|
| Popcorn | 50.0 pounds | 50.0 pounds |
| Salt | 2.2 pounds | 2.2 pounds |
| Water | 2.5 pounds | 2.5 pounds |
| Artificial Butter Flavors | — | 0.7 pounds |
| Kelcoloid S | 75 grams | 75 grams |
| Artificial Colors | — | 12 grams |

EXAMPLES 5 Through 20

Add water to Waring blender along with gum, protein, or other adhesive, if applicable, and blend at high speed for 5 minutes or until uniform. Place popcorn in small lab pill coating type revolving pan. (Brucks-Model VII G), with about 1 inch flights added every 90°. Start pan rotating at about 40 rpm. and add adhesive solution or plain water for Example 10. Allow to mix about 2 minutes or until uniform then add salt, flavors and color where applicable. Continue mixing by rotating for about 3 additional minutes or until uniform. While still rotating, direct heated air, (about 125° F.), running at maximum velocity, into the pan at the corn surface. Continue running the heated air until the corn is dry and free flowing (about 20 minutes) and ready for popping.

|  | Example 5 | Example 6 | Example 7 |
|---|---|---|---|
| Popcorn | 6000 gm. | 6000 gm. | 6000 gm. |
| Salt | 425 gm. | 425 gm. | 425 gm. |
| Water | 282 gm. | 282 gm. | 282 gm. |
| Artificial Butter Flavors | — | 72 gm. | — |
| Kelcoloid S | 18 gm. | 18 gm. | — |
| Xanthan gum | — | — | 18 gm. |
| Artificial Colors | — | 1 gm. | — |

|  | Example 8 | Example 9 | Example 10 |
|---|---|---|---|
| Popcorn | 6000 gm. | 6000 gm. | 6000 gm. |
| Salt | 425 gm. | 425 gm. | 425 gm. |
| Water | 282 gm. | 282 gm. | 282 gm. |
| Gum Arabic | 18 gm. | — | — |
| 100 Bloom Gelatin | — | 18 gm. | — |

|  | Example 11 | Example 12 | Example 13 |
|---|---|---|---|
| Popcorn | 6000 gm. | 6000 gm. | 6000 gm. |
| Salt | 425 gm. | 425 gm. | 425 gm. |
| Water | 282 gm. | 282 gm. | 282 gm. |
| 150 Grade Pectin | 18 gm. | — | — |
| 4 DE Malto-Dextrin | — | 18 gm. | — |
| Mannitol | — | — | 18 gm |

|  | Example 14 | Example 15 | Example 16 |
|---|---|---|---|
| Popcorn | 6000 gm. | 6000 gm. | 6000 gm. |
| Salt | 425 gm. | 425 gm. | 425 gm. |
| Water | 282 gm. | — | 24 gm. |
| Pregelatinized Waxy Maize Starch | 18 gm. | — | — |
| Polyvinyl Acetate 50% (Water Emulsion) | — | 36 gm. | — |
| Ethyl Alcohol | — | — | 138 gm. |
| Zein | — | — | 18 gm |

|  | Example 17 | Example 18 | Example 19 | Example 20 |
|---|---|---|---|---|
| Popcorn | 6000 gm. | 6000 gm. | 6000 gm. | 6000 gm. |
| Salt | *325 gm. | 425 gm. | 325 gm. | 30 gm. |
| Water | 875 gm. | 75 gm. | 125 gm. | 350 gm. |
| 100 Bloom Gelatin | — | **25 gm. | **15 gm. | — |
| Kelcoloid S | — | — | — | 23 gm. |
| Artificial Butter Flavors | — | — | 65 gm. | ***4 gm. |
| Artificial Colors | — | — | 1 gm. | 7 gm. |
| Aspartame | — | — | — | 4 gm. |

*Salt predissolved in water before adding to popcorn.
**Gelatin dissolved in warm water after which 25 grams salt is also dissolved before adding to popcorn.
***Artificial Caramel flavors.

EXAMPLE 21

Place popcorn in small lab pan (See procedure for Examples 5–20). Rotating at 40 rpm., add ⅓ of the sodium hydroxide solution and allow to mix 30 seconds. Add ⅓ of the hydrochloric acid solution and allow to mix 2 minutes. Continue with this cycle two more times, after which add sodium bicarbonate and salt and continue rotating (mixing) an additional 2 minutes. Dry as in Example 5–20.

|  | Example 21 |
|---|---|
| Popcorn | 6000 gm. |
| Salt | 230 gm. |
| NaOH 10% Solution | 480 gm. |
| HCl 10% Solution | 435 gm. |
| Sodium Bicarbonate | 10 gm. |

EXAMPLES 22 through 25

Heat water to 160° F., add salt and stir until dissolved. Add this solution to popcorn and allow to stand, (Time Varies), with an occasional stir. Drain solution from popcorn and dry in small lab convection oven as for Examples 1 and 2. The time required to dry was about 30 minutes. The product is free-flowing after drying and ready for popping.

|  | Example 22 | Example 23 | Example 24 | Example 25 |
|---|---|---|---|---|
| Popcorn | 250 gm. | 250 gm. | 250 gm. | 250 gm. |
| Salt | 76 gm. | 76 gm. | 76 gm. | 76 gm. |
| Water | 200 gm. | 200 gm. | 200 gm. | 200 gm. |
| Stand time | 5 min. | 15 min. | 30 min. | 60 min. |

The following are results of the above examples:

|  | % Salt Unpopped | % Salt Popped | % Salt Retention | Popped Volume From 110 Gm. Cubic Inches | % Volume Of Original Untreated Popcorn |
|---|---|---|---|---|---|
| Popcorn | — | — | — | 250 | 100.0 |
| Example 1 | 4.9 | 2.9 | 59 | 204 | 81.6 |
| Example 2 | 4.3 | 3.8 | 88 | 199 | 79.6 |
| Example 3 | 4.3 | 3.9 | 91 | 222 | 88.8 |
| Example 4 | 5.6 | 3.7 | 66 | 154 | 61.6 |

-continued

| | % Salt Un-popped | % Salt Popped | % Salt Retention | Popped Volume From 110 Gm. Cubic Inches | % Volume Of Original Untreated Popcorn |
|---|---|---|---|---|---|
| Example 5 | 5.6 | 2.1 | 38 | 209 | 83.6 |
| Example 6 | 5.5 | 3.5 | 64 | 224 | 89.6 |
| Example 7 | 6.0 | 1.9 | 32 | 215 | 86.0 |
| Example 8 | 3.6 | 2.4 | 67 | 220 | 88.0 |
| Example 9 | 4.4 | 4.2 | 96 | 227 | 90.8 |
| Example 10 | 1.9 | 1.7 | 90 | 216 | 86.4 |
| Example 11 | 6.1 | 2.5 | 41 | 210 | 84.1 |
| Example 12 | 2.9 | 2.0 | 69 | 213 | 85.2 |
| Example 13 | 1.7 | 1.7 | 100 | 196 | 78.3 |
| Example 14 | 5.0 | 2.6 | 52 | 213 | 85.2 |
| Example 15 | 0.9 | 0.9 | 100 | 223 | 89.3 |
| Example 16 | 0.8 | 0.5 | 63 | 238 | 95.0 |
| Example 17 | 2.6 | 2.5 | 94 | 207 | 83.0 |
| Example 18 | 3.7 | 3.3 | 91 | 235 | 93.9 |
| Example 19 | 4.6 | 4.4 | 96 | 222 | 88.8 |
| Example 20 | 0.5 | 0.5 | 100 | 203 | 81.2 |
| Example 21 | 3.9 | 3.5 | 91 | 150 | 60.2 |
| Example 22 | 3.6 | 2.6 | 73 | 230 | 91.8 |
| Example 23 | 4.4 | 2.8 | 63 | 221 | 88.6 |
| Example 24 | 4.0 | 3.0 | 74 | 220 | 88.2 |
| Example 25 | 5.0 | 3.4 | 68 | 213 | 85.1 |

EXAMPLE 26

Spray Coating of Popping Corn

A uniformly coated, salted popping corn for hot air popping was prepared using a spray-on method for coating as follows:

| Ingredient | Amount (lbs.) |
|---|---|
| Gelatin (100 Bloom) | 0.42 |
| Water | 2.08 |
| Table Salt | 0.23 |
| | 2.73 |

The gelatin coating solution was prepared by weighing the water at about 160° F.–180° F. in a mixer equipped kettle and adding the gelatin, slowly, under high agitation. Mixing is continued for about 15 minutes until a uniform solution is obtained. Salt is then added and mixing is continued for about 5 minutes.

A hundred pound batch of popping corn is fed onto a conventional conveyor running at a rate of 100 lbs./hour by means of a hopper. The above prepared gelatin solution is pumped through spray nozzles and sprayed on the popping corn at a rate of 2.73 lbs./hour to thereby coat the popcorn. The gelatin coated popping corn is then transferred to a conventional vibrating conveyor wherein salt is dispensed thereon from a hopper at the rate of 4.2 lbs./hour. The gelatin and salt coated popcorn is then transferred by conveyor onto drying trays and dried at about 120° F. for approximately 40 minutes in a commercial dryer, such as that manufactured by Proctor & Schwartz, to give a final unpopped corn product having a salt content of about 4.60% and a moisture content of about 12% by weight. A 110 gram sample of the resulting spray coated popcorn was popped in a standard hot air popper to give a final popped corn having a popped volume of 190 cubic inches and a final salt content of about 3.4% by weight. Thus the final popped corn retained about 73.9% of the originally added salt while giving a volume of approximately 76% of that of untreated popping corn control sample.

EXAMPLE 27

This example is intended to show the critical use of oil, fat or shortening in obtaining the "savory coated or glazed" popcorn as taught in U.S. Pat. No. 3,851,574 to M. H. Katz, et. al., wherein an unpopped corn is packaged in intimate relationship with a coating "matrix" consisting essentially of sugar, a hydrophillic film former, fat and flavoring to give a continuously coated kernel of popping corn upon frying in the melted fat or oil within an expandable package when the package is heated in a microwave oven.

A glazed unpopped popcorn was prepared in accordance with the procedure and formulation in Col. 5, line 33–43 and 58–65, of the above-mentioned Katz, et. al. patent both with and without oil.

The popcorn prepared in accordance with the process in the Katz, et. al. patent comprised popcorn in a sticky matrix of fat and corn syrup, sugar, caramel and salt and was not uniformly coated as in the comparison product prepared in accordance with the preferred embodiment of this invention for salt covered popcorn.

The popcorn prepared in accordance with the process of Katz, et. al., but without added shortening, on the other hand, consisted of discrete popcorn in a powdered pre-mix of corn syrup solids, sugar, caramel flavor and salt.

Upon heating in a commerical microwave oven at half power, the fat-containing popcorn matrix yielded an acceptable popped corn with the shortening melting to allow coating of the entire surface of the separated popped kernels, whereas the popcorn prepared in accordance with the procedure in Katz, et al., but without fat or shortening, charred and remained one solid mass without retention of added flavorants. In contrast, the uniformly coated popcorn of the instant invention has a uniformly coated, free-flowing unpopped hull which, when popped in a hot air popper, yields kernels which are free-flowing and yet which retain substantially all of the salt and added flavor on only the hull of the corn, while leaving the popped kernel surface non-sticky and free-flowing.

EXAMPLE 28

An unpopped popcorn was also prepared with the formulation in Col. 5, lines 58–65 of the above mentioned Katz, et al. patent, but with 11.64 parts by weight of water in place of the specified 10.2 parts of shortening. The procedure set forth in Col. 5, lines 33–43 of Katz was used to give a coated unpopped corn product. This coated unpopped corn was, of course, quite different in physical characteristics from that taught by Katz in which the only continuous phase coating on the unpopped corn is a fat or shortening. This product was formulated in an attempt to form a coating or glaze product with the formulation of Katz when oil or shortening is not used, since the fat is critical in Katz to formation of a coated product with the other specified coating additives. The use of fat in Katz is most likely also required to isolate the moisture in the popcorn and therefore prevent migration of moisture from the popcorn to the water soluble coating materials. This would avoid a decrease in popcorn expansion, as suggested by the U.S. Pat. No. 3,704,133 to Kracauer, where an oil emulsion is specifically used to prevent migration of water to the water soluble coating additives.

The aqueous solution coated unpopped corn prepared in accordance with the above modified mixture of the Katz patent was heated in a commercial microwave oven. The resulting product, unlike the uniformly coated unpopped corn of the instant invention, became a charred and burned mass without the characteristic expansion and without any retention of added flavorants.

As shown in Examples 27 and 28, the fat or shortening used in the continuous coating of Katz, unlike the instant invention, is needed to obtain a continuous coated product and to achieving poppability in a microwave oven to give a final flavored popcorn.

Though the process and product of this invention has been described with regard to specific types and classes of edible adhesives, it is understood that other types and classes of edible adhesives could also function in the practice of this invention, with the selection being obviously dependent upon the adhesive property, degree of solubility in water or other food grade solvent used, economics, etc. Thus, for example, cellulose and cellulose derivatives such as hyproxypropyl cellulose, methyl cellulose, cellulose acetate, ethyl cellulose, salts of carboxymethyl cellulose, and xylitol could be used.

In addition to gums and other adhesives previously mentioned, pectins; vegetable gums and their derivatives, such as carrageenan, gum karaya, guar, locust bean; and proteins such as a soy protein, casein, collagen, and polyglutamic acid would also function to a greater or lesser degree. Starches such as corn, tapico, wheat, and oxidized or hydrolized starches and sorbitol can also be used as edible adhesives in this invention.

Natural resins and their derivatives, e.g. shellac, glycerol esters of wood resin, Dammar resin and colophonium and polymers such as polyvinyl acetate, polyvinyl alcohol and polyvinyl pyrrolidone could also be used as adhesives.

The use of particular adhesives, such as those listed above, as direct food additives may, of course, be limited by FDA approval for GRAS addition to popcorn, but they may, nonetheless, be used in encapsulating flavors, to give an FDA-acceptable product.

The flavorants which can be used in the popcorn product of this invention can also be widely varied. Edible salts such as calcium chloride and potassium chloride "salt substitutes" can, for example, be used as flavorings in place of conventional sodium chloride salt.

Applicants having thus described their invention, obvious modifications will be apparent to those skilled in the art and Applicants therefore intend to limit the invention only by the scope of the appended claims.

We claim

1. A method for preparing a substantially fat and oil free flavored unpopped popcorn which retains its flavor upon popping in a hot air popper comprising the steps of treating an unpopped popcorn with an alkali solvent for the cellulose in the corn hull for a period of time sufficient to produce a soluble adhesive cellulosic hull surface and thereafter mixing the resulting soluble cellulosic corn hull with an acid solution to neutralize the pH of the treated hull; mixing the resulting unpopped popcorn with flavorants and then drying to a moisture content of about 12% by weight-unpopped corn to give an unpopped corn having a substantially uniformly adhered flavorant coating thereon which will remain adhered to the hull of the popcorn after the popping in a hot air popper.

2. The method of claim 1 wherein the unpopped corn hull is treated with sodium hydroxide to solubilize the cellulose of the hull and wherein the treated hull is thereafter treated with dilute hydrochloric acid to neutralize the alkaline pH of the hull prior to addition of salt and other flavorants.

3. A method for preparing a free-flowing popcorn product that comprises a plurality of unpopped, free-flowing popcorn kernels each of which is coated with a dry, fixedly adhered coating, comprising
   (1) obtaining popcorn kernels;
   (2) preparing a coating solution of a solvent and an edible adhesive material, together with a desired amount of at least one flavorant, said solvent being selected from the group consisting of water, ethanol and other low boiling, non-toxic solvents, the amount of said solvent being 0.28% to 12.15% by weight based on the weight of said untreated popcorn kernels, the amount of said edible adhesive material being sufficient to adhere said flavorant to said kernels respectively, the amount of said at least one flavorant being no more than the amount that will fully dissolve in said amount of solvent;
   (3) mixing the popcorn kernels of step (1) with the product of step (2) thereby to form coated popcorn kernels and then
   (4) drying the mix of step (3) to a suitable moisture content.

4. The method of claim 3 wherein said edible adhesive material is a gelatin and is present in the dried coating on said unpopped kernels in an amount of 0.28% to 2.1% by weight based on the weight of the coated, unpopped corn kernels.

5. The method of claim 4 wherein said flavorant comprises sodium chloride in an amount of 0.47% to 6.6% by weight based on the weight of the coated unpopped corn kernels.

6. The method of claim 3 wherein the residual moisture content of the coated unpopped corn kernels, after said coating drying step, is from 11% to 14% by weight based on the unpopped coated corn kernels.

7. The method of claim 3 wherein said edible adhesive material is selected from the group consisting of gelatin, vegetable gum, starch and starch hydrolyzates, proteins, polyvinyl acetate, and mixtures thereof.

8. A method for preparing a free-flowing popcorn product that comprises a plurality of unpopped, free-flowing popcorn kernels each of which is coated with a dry, fixedly adhered coating comprising:
   (1) applying to unpopped popcorn kernels a coating solution comprising a solvent and gelatin together with a desired amount of at least one flavorant, said solvent being selected from the group consisting of water, ethanol and other low-boiling, non-toxic solvents, the amount of said solvent being 0.28% to 12.15% by weight on the weight of said unpopped popcorn kernels, the amount of said gelatin being 0.28% to about 2.1% by weight of said product and the amount of said at least one flavorant being no more than the amount that will fully dissolve into said amount of solvent;
   (2) spraying all or some part of said coating solution on said unpopped popcorn kernels in order to coat said popcorn kernels and
   (3) drying said coated popcorn kernels substantially to the moisture content of said original unpopped popcorn kernels.

9. The method of claim 8 that further includes the step in which water-soluble flavorant is dispensed onto said coated kernels before drying them.

10. The method of claim 9 in which said flavorant is salt.

11. The method of claim 8 in which food coloring is added to said coating solution.

12. The method of claim 8 in which said solvent is water.

13. A method for preparing a free-flowing popcorn product that comprises a plurality of unpopped, free-flowing popcorn kernels each of which is coated with a dry, fixedly adhered coating comprising;
(1) applying to unpopped popcorn kernels a coating solution comprising a solvent and an edible adhesive material, said edible adhesive material being an edible adhesive material other than gelatin together with a desired amount of at least one flavorant, said solvent being selected from the group consisting of water, ethanol and other low-boiling, non-toxic solvents, the amount of said solvent being 0.28% to 12.15% by weight based on the weight of said unpopped popcorn kernels, the amount of said edible adhesive being an amount which provides adhesiveness equivalent to the adhesiveness that would be provided if 0.28% to about 2.1% by weight of said product of gelatin were used as the edible adhesive material and the amount of said at least one flavorant being no more than the amount that will fully dissolve into said amount of solvent;
(2) spraying all or some part of said coating solution on said unpopped popcorn kernels in order to coat said popcorn kernels and
(3) drying said coated popcorn kernels substantially to the moisture content of said original unpopped popcorn kernels.

14. The method of claim 13 that further includes the step in which water-soluble flavorant is dispensed onto said coated kernels before drying them.

15. The method of claim 14 in which said flavorant is salt.

16. The method of claim 13 in which food coloring is added to said coating solution.

17. The method of claim 13 in which said solvent is water.

* * * * *